United States Patent [19]

Lewis

[11] Patent Number: 4,551,972
[45] Date of Patent: Nov. 12, 1985

[54] ENGINE MANAGEMENT SYSTEM

[75] Inventor: Leon D. Lewis, Rancho Palos Verdes, Calif.

[73] Assignee: The Garrett Corporation, Los Angeles, Calif.

[21] Appl. No.: 664,949

[22] PCT Filed: Aug. 21, 1980

[86] PCT No.: PCT/US80/01065

§ 371 Date: Mar. 4, 1982

§ 102(e) Date: Mar. 4, 1982

[87] PCT Pub. No.: WO82/00687

PCT Pub. Date: Mar. 4, 1982

Related U.S. Application Data

[63] Continuation of Ser. No. 358,931, Mar. 4, 1982, abandoned.

[51] Int. Cl.[4] .............................................. F02C 9/28
[52] U.S. Cl. ................................................. 60/39.281
[58] Field of Search ................ 60/39.281; 74/469, 510

[56] References Cited

U.S. PATENT DOCUMENTS 3,174,284  3/1965  McCarthy .
3,721,088  3/1973  Lewis .
3,808,801  12/1971  Taylor .
3,813,063  5/1974  Martin ............................ 60/39.281
3,832,846  9/1974  Leeson .
3,839,860  9/1974  Martin .
3,852,956  12/1974  Martin .
3,854,287  12/1974  Rembold .
3,875,390  4/1975  Eccles et al. .
4,134,257  1/1979  Riple .
4,197,699  4/1980  Parker et al. .
4,248,042  2/1981  Larsen et al. .
4,258,545  3/1981  Slater .
4,259,838  4/1981  McCollum, Jr. et al. .

FOREIGN PATENT DOCUMENTS 2005790  4/1979  United Kingdom .

OTHER PUBLICATIONS

Control Engineering, vol. 25, No. 10, Oct. 1978, pp. 55–56.
Aviation Week & Space Technology, Apr. 21, 1980, pp. 191–192.
Douglas Service, vol. 34, Mar./Apr. 1977, pp. 14–19.

Primary Examiner—Louis J. Casaregola
Attorney, Agent, or Firm—Leslie S. Miller; James W. McFarland; Albert J. Miller

[57] ABSTRACT

A limited authority system for controlling engine performance in accordance with energy or thrust requirements in response to engine parameters which is capable of operating in a number of control modes.

20 Claims, 9 Drawing Figures

ENGINE MANAGEMENT SYSTEM

This application is a continuation of application Ser. No. 358,931 filed Mar. 4, 1982, abandoned.

This invention relates to fuel control systems and, more particularly, to an engine management system which may be coupled to a conventional fuel control system for an aircraft to add limited authority control which is capable, particularly on a multiple engine plane, of eliminating a substantial amount of flight crew work necessary to optimize thrust on takeoff and climb, synchronize engines at a desired level of temperature, engine pressure ratio, engine speed or air speed during climb or at cruise, and to provide fine tuning of engine controls at flight idle configuration during descent. In addition, the system can be used to optimize energy utilization through control of aircraft flight profile. As a result, significant fuel savings may be realized.

With respect to any vehicle engine, it is necessary to provide a fuel metering device responsive to a suitable control for metering sufficient quantities of fuel to the engine to keep the engine running and to provide motive power to the vehicle throughout its entire operating range. The control may be electronic, electromechanical, mechanical, hydraulic or of any other type suitable for responding to the inputs provided thereto to command the desired response from the fuel metering device.

The use of engines, and particularly gas turbine engines, in aircraft requires particular care in fuel control to maintain its operating range, without inadvertently causing damage to the engines or otherwise causing termination of operation of the engines. To this end, turbine engine fuel control systems have utilized numerous monitoring devices for sensing fan speed ($N_1$), gas generator speed ($N_2$) and turbine gas temperature (TGT) among other parameters and used this information to optimize engine performance.

However, even with such complex fuel control circuitry, it is necessary to closely monitor engine performance during the various flight modes and manually adjust the throttle levers for the engines so that specified engine conditions can be achieved during various operating modes of the aircraft.

During a typical flight, a substantial amount of throttle adjustment must be performed by the flight crew to obtain desired engine thrust levels without exceeding safe engine operating limits. For example, during takeoff, the throttles will generally be set so that each engine achieves the maximum thrust configuration. During initial climb, the engines are preferably set to achieve maximum continuous thrust without exceeding the engine's maximum permissible limits, e.g. temperature or engine pressure ratio. During cruise operation, the engines may be controlled to maintain precise temperatures or engine pressure ratios or aircraft cruising speeds while the engines are prevented from running out of speed synchronization. During landing, the flight idle throttle lever positions must be continually monitored and adjusted to achieve the necessary thrust level as atmospheric conditions rapidly change upon reducing altitude.

Systems have been provided in the prior art which have monitored limited numbers of engine or flight parameters to advise the crew of the correct throttle settings or to provide one or more of the control functions outlined above, such as engine pressure ratio or air speed compensation of engines or synchronizing or synchrophasing of engines to the performance of a designated master engine. Such prior art systems generally operated to control engine performance in one of two ways. One type of system integrates the desired functions into a complex fuel control computer, preferably of the electronic type. Another type of control device utilizes an autothrottle system.

Both approaches suffer substantial drawbacks. Autothrottle systems are very expensive and carry substantial size and weight penalties associated with the powerful drive motors required to maneuver the throttle levers for fuel control. Additionally, automatic control with an autothrottle is difficult or impossible under conditions where the pilot maintains his hand upon the throttle levers for the purpose of exercising additional manual control inasmuch as such manual control activates clutch devices which negate the effect of the autothrottle. Also, the great length of cable through which autothrottle commands must be sent to the fuel metering device can result in "hunting" by the autothrottle in seeking correct throttle settings. Complex computer control, while quite effective, generally requires the functions to be designed into the system at its inception rather than being later integrated into the computer system. As a result, retrofit of such a system into an existing aircraft may be very difficult.

In accordance with this invention, an engine management system is provided which monitors engine and external parameters to provide limited authority control of the engines throughout the various operating modes of an aircraft. In one aspect, engine characteristics such as shaft or spool speed, engine temperature or engine pressure ratio may be controlled either for all engines or for a single master engine with the remaining engines being synchronized to the selected master. Alternatively, calibrated air speed or mach number can be controlled with or without synchronization of the engines. In a second aspect, flight characteristics of the airplane can be carefully monitored and aircraft flight parameters, such as airspeed, climb rate, and altitude, can be controlled as well as engine parameters in accordance with desired energy management characteristics, such that desirable flight characteristics, such as those yielding minimum fuel use, minimum flight time, minimum cost or maximum endurance can be obtained.

Authority over engine thrust is limited to a predetermined percentage of throttle travel and is established by interposing an adjustable member in the trottle linkage in close proximity to the engine fuel metering control device. By such means, it is possible to retrofit substantially any aircraft even an aircraft already equipped with an autothrottle, to incorporate the engine management system of this invention. Further, drive motors of much lower weight and size than required for autothrottles may be utilized with a corresponding substantial reduction in system cost. In addition, throttle trim control may be achieved at all times by direct action on the engine fuel metering device control without any motion of the throttle levers in the cockpit being produced thereby. Thus, grasping of the trottle levers by the pilot or locking of the throttle levers will not in any way impede the desired operation of the engine management system throughout the entire flight profile of an aircraft and no lag in response to system commands due to control cable length will occur. If desired, electrical, mechanical or other suitable means may be provided to prevent modification of throttle settings by the engine management system of this invention during certain modes of flight and in certain throttle lever positions.

The advantages of this invention will be readily apparent when the following specification is read in conjunction with the appended drawings, wherein.

Figure 1:
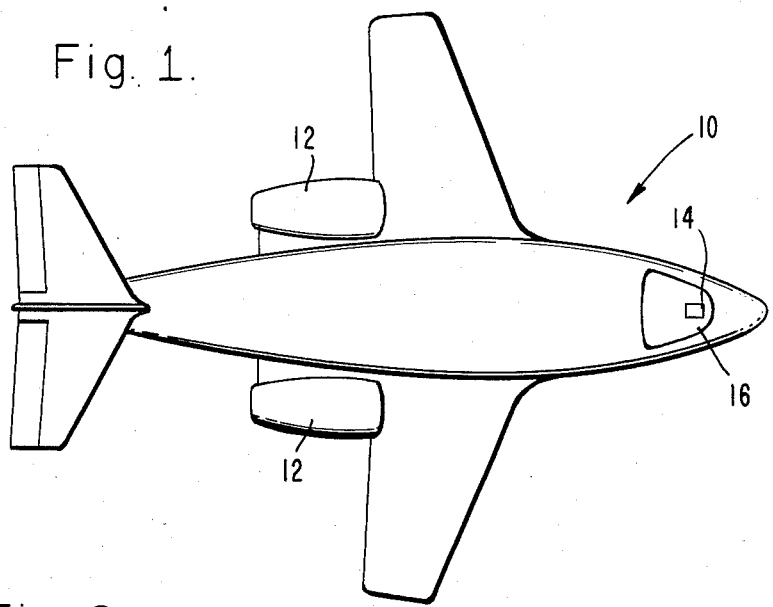
FIG. 1 is a schematic view of an aircraft which may be adapted with an engine management system in accordance with this invention.

Referring now to the drawings, FIG. 1 illustrates an aircraft 10 having engines 12 which are controlled by the flight crew through the use of a throttle quadrant 14 in the cockpit 16.

Figure 2:
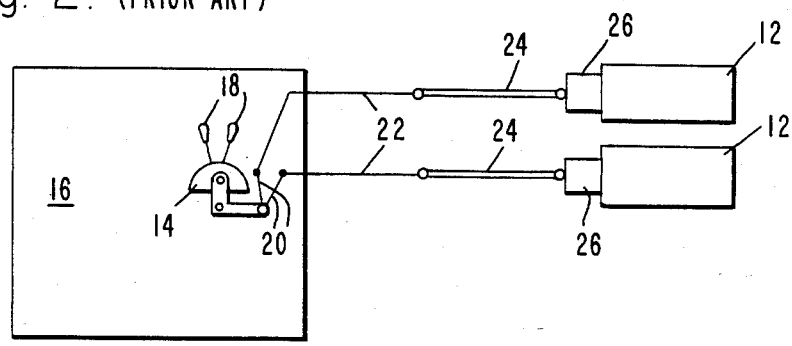
FIG. 2 is a schematic representation showing engine control in accordance with the prior art.

Referring now to FIG. 2, the throttle quadrant 14 is seen to contain a plurality of power levers or throttle levers 18, each of which is attached to move a drive lever 20. In the twin engine embodiment illustrated, the throttle quadrant will contain two power levers. Each drive lever 20 is connected through suitable means such as a cable 22 to a link 24 through which motion of the trottle lever 18 controls operation of a fuel meterin device 26 for providing operating fuel to its associated engine 12. While a straight link for conveying linear motion is illustrated, rotary or other types of actuation may be used and are adaptable to the engine management system of this invention. Each fuel metering device 26 will generally be a suitable fuel control computer of an electrical, mechanical, hydraulic or other suitable type which acts in response to input from the throttle quadrant and from monitoring devices responsive to engine and external parameters to provide a precise control of its associated gas turbine engine.

Figure 3:
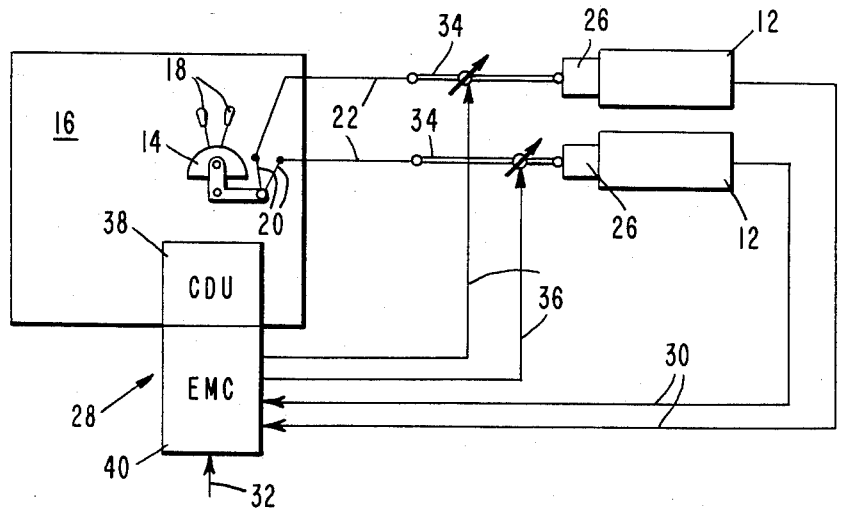
FIG. 3 is a schematic diagram similar to FIG. 2 illustrating engine control showing the addition of an engine management system of this invention.

In accordance with this invention, the engine control system is modified (see FIG. 3) by the installation of an engine management system 28 which monitors parameters of the engines 12 by way of suitable communications means such as conductors 30 and monitors external parameters by way of conductor 32 for providing limited authority trim for the operation of the fuel metering devices 26.

Trimming operation is accomplished by the substitution of an adjustable link 34 which has a variable dimension for modifying the effect on the fuel metering device 26 of changes in the position of the throttle levers 18. The variable dimension link also permits limited adjustments of the fuel metering device 26 without any motion of the throttle levers 18. Change in the variable dimension is provided by input to the link 34 from the engine management system 28 through conductors 36.

The engine management system 28 may be contained in a single module or multiple modules. In the preferred embodiment, a control and display unit (CDU) 38 will be mounted in the cockpit and electrically connected to an engine management computer (EMC) 40 mounted in a location remote from the cockpit which may be adjacent an engine nacelle or in the instrumentation bay or at any other convenient location.

In the preferred embodiment, variable dimension link 34 (see FIG. 4) is in the form of an actuator of adjustable length. An outer tubular rod 42 and an inner rod 44 are nested and provided with mating threads to serve as a jackscrew driven by an electric motor 46 through suitable gearing 48. A first end 50 is preferably attached to cable 22 and a second end 52 is attached to the fuel metering device 26 and is movable with respect to the first end 50 upon threaded interaction of the rods 42 and 44 to effect an expansion or shortening of link 34. Suitable bearings 54 facilitate ease of rotation of the inner rod 44 while mechanical stops (not shown) may be used to insure prompt termination of rod rotation so that the critical variable dimension of the link 34 will be precisely determined. Link 34 serves to convey motion of the throttle lever 18 to the fuel metering device 16 and will be seen to modify the rate of uel flow provided at any given setting of the throttle lever 18 in response to operation of motor 46. Except for changes in its variable dimension produced by operation of motor 46 in response to output of the engine management computer 40, link 34 remains fixed in dimension and directly conveys motion of the throttle lever 18 to the fuel metering device 26.

A centering switch 58 contains two sets of contacts which are operated by actuators 60 and 62 when engaged by cam surfaces 64 and 66 of a centering switch cam 68 which is carried by the outer rod 42 for axial motion of the link 34. When the variable dimension of the link is a predetermined length which is preferably midway between its fully extended and fully shortened position, it is deemed to be centered and the centering switch cam is situated such that both actuator 60 and 62 are positioned in a depression 70 between cam surfaces 64 and 66 and not engaged thereby. Whenever the link 31 is extended or shortened from this centered position, either the actuator 60 or actuator 62 is engaged by its respective cam surface 64 or 66 so that the condition of the switch contacts operated thereby is modified. Operation of the centering switch will be further described subsequently herein.

Figure 5:
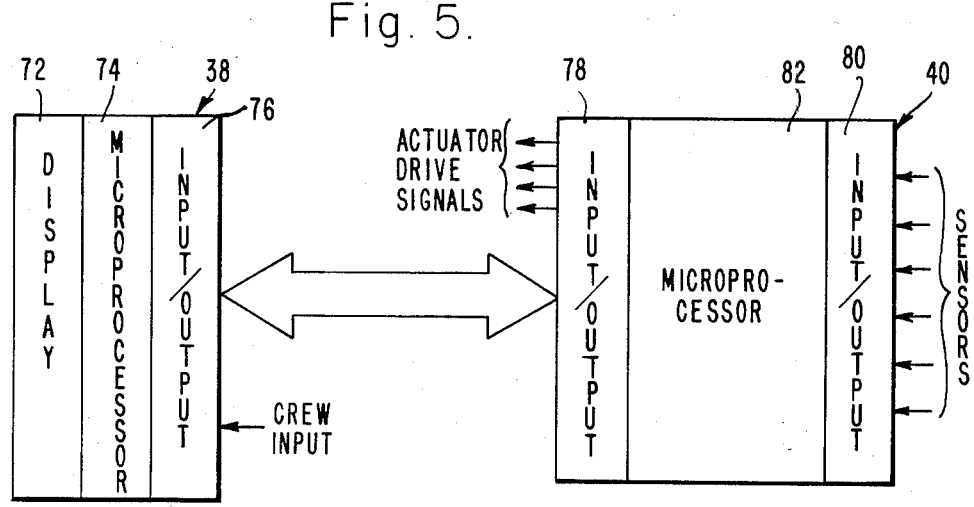
FIG. 5 is a schematic block diagram of an engine management computer and a control and display unit of the engine management system of of FIG. 3.

FIG. 5 illustrates a basic block diagram of logic components of the engine management system 28. The control and display unit 38 which is located in the aircraft cockpit accessible to the flight crew has a display section 72 for providing information to the flight crew of the functioning of the engine management system in addition to advising of any possible malfunctions of the system or engine components detectable thereby. A microprocessor section 74 performs all memory and calculation functions required of the CDU 38. Input-/output sections 76 permit direct control by the flight crew with respect to mode selection and the input of controllable parameter values. Input/output sections of the CDU also provide for communication between the control and display unit 38 and corresponding input-/output section 78 of the engine management computer 40.

The engine management computer 40 also contains additional input/output section 80 which receives parametic inputs such as signals from the engines as well as other sources of information necessary for the control of engine thrust or flight profile. Such parameters inputs may include fan speed, gas generator speed, turbine gas temperature, altitude, total engine temperature, air speed, fuel use information, engine bleed status, and throttle lever or power lever angle. This information is fed to a microprocessor section 82 which, through the use of algorithms stored therein, calculates the approximate signal to be transmitted to the variable dimension links 34. At least one selected engine performance characteristic such as those mentioned above is compared with desired values for that engine performance characteristic represented by flight crew input of controllable parameter values. This information is also sent to the microprocessor section 74 of the control and display unit 38 wherein selected calculations are performed to verify these results. If the results of the calculations in both microprocessor sections are consistent, the results are fed through the input/output section 78 of the engine management computer 40 to control the electric motor 46 of the variable dimension line 34 (FIG. 4) so that engine performance may be suitably controlled. If, however, the two microprocessor sections 74 and 82 calculate different engine trim solutions, this is detected and annunciated by the system.

Figure 6:
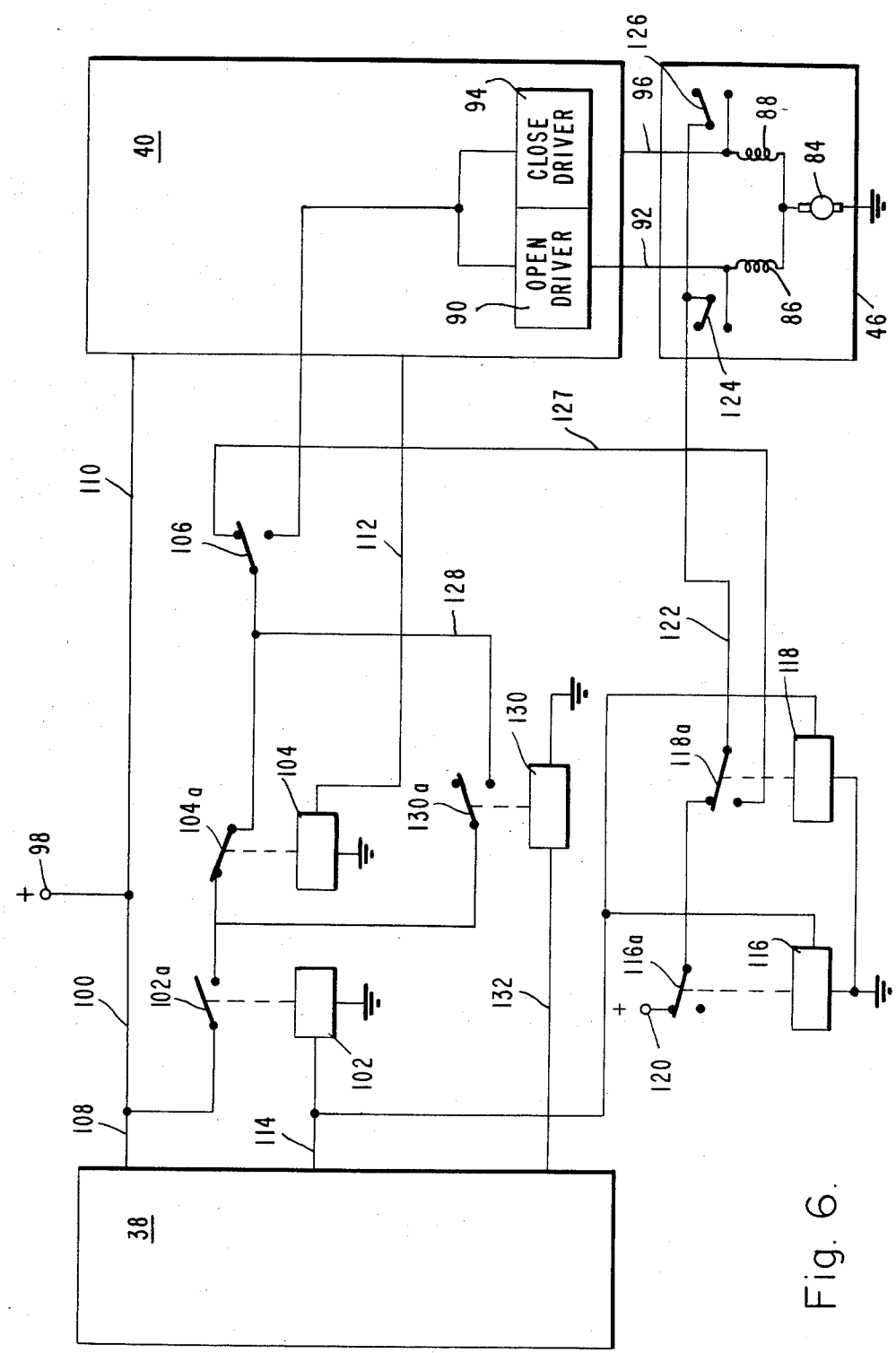
FIG. 6 is a schematic diagram showing electrical switching operation for use in the engine management system of FIG. 3.

FIG. 6 illustrates switching functions which are performed within the preferred embodiment of the engine management system of this invention. Electric motor 46 of the variable dimension link 34 comprises an armature 84 and two field windings 86 and 88 which are wound so as to be in electrical opposition to each other such that energizing the motor through field winding 86 will cause rotation of the armature in one direction and energizing the motor through field winding 88 and will cause rotation of the armature in the opposite direction. Thus, an open driver 90 in the engine management computer 40 can be activated to provide electrical power to field winding 86 and armature 84 through a conductor 92 to turn the armature in one direction to open or expand the variable dimension link 34 while a close driver 94 can be activated to energize field winding 88 and armature 84 through a conductor 96 to close or shorten the variable dimension link 34.

Electrical power for the motor 46 is received from a voltage source 98 which is connected by a conductor 100 through a normally open contact 102a of a go around relay 102, a normally closed contact 104a of an air speed relay 104, and a single pole, double throw throttle lever switch 106. Throttle lever switch 106 has two positions. When the throttle levers are set below flight idle position, the switch is in the position illustrated in FIG. 6. At or above flight idle, the switch moves to the lower position. Power is also provided from the voltage source 98 to the control and display unit 38 through a conductor 108 and to the engine management computer 40 through a conductor 110.

The air speed 104 is energized by a signal transmitted either from the engine management computer 40 or directly from an air speed responsive switch (not shown) through a conductor 112 causing contact 104a to open when air speed reaches a predetermined value, preferably around 75 knots. The go around relay 102 is energized by a signal from the control and display unit through a conductor 114 to hold contact 102a closed during all phases of flight. This signal stops when the go around button is depressed to permit contact 102a to open. Conductor 114 also transmits this signal to a centering relay 116 operating a normally closed contact 116a and to primary relay 118 operating a single pole, double throw contact 118a. Contacts 116a and 118a are serially connected to a voltage source 120 by a conductor 122 which terminates at centering switches 124 and 126 and contact 118a is connected to power lever switch 106 by a conductor 127.

When energized through conductor 122, the centering switches, which are selectively actuated by either of actuators 60 or 62 being depressed by interaction with the centering switch cam 68, act to bring the variable dimension link to its centered position. When the system is not in its go around mode, the centering switches 124, 126 will be energized whenever the throttle lever is at less than flight idle through a circuit comprising voltage source 98, conductor 100, contact 102a, contact 104a (or at above 75 kts, conductor 128 and contact 130a), power lever switch 106, conductor 127, contact 118a, and conductor 122. When in the go around mode, the centering switches are energized by a circuit from voltage source 120 through contact 116a, contact 118a and conductor 122. Whenever system power is turned off, the centering switches are energized in the same manner as in the go around mode inasmuch as voltage source 120 always remains energized.

A conductor 128 is connected to conductor 100 across the contact 104a of the air speed relay 104 and has a normally open contact 130a of a takeoff relay 130 interposed therein. The takeoff relay 130 receives an energizing signal from the control and display unit 38 through a conductor 132 to short circuit the takeoff relay contact 104a in all modes except the takeoff mode of the engine management system.

Figures 7, 8:
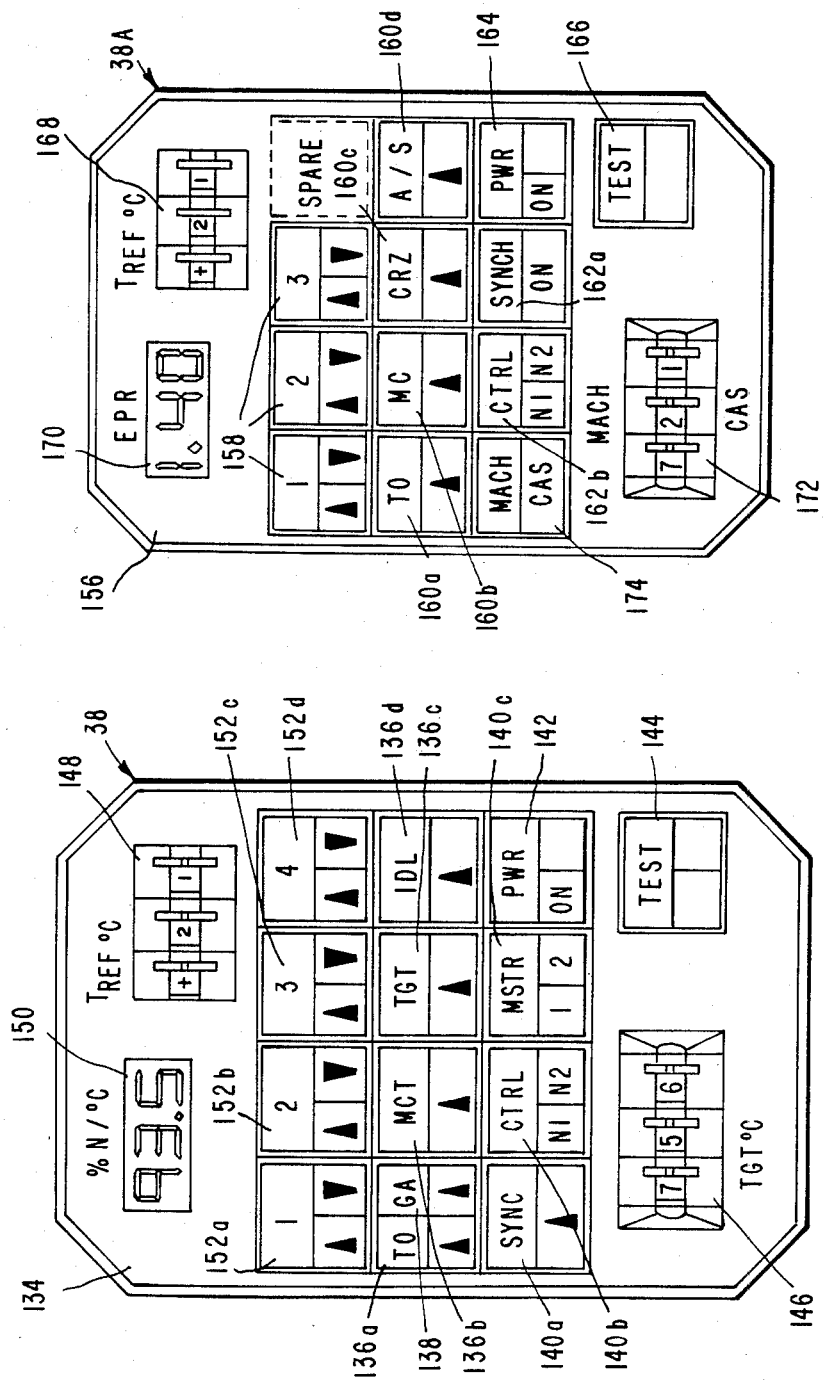
FIG. 7 illustrates the face of a control and display unit in accordance with the preferred embodiment of this invention.
FIG. 8 illustrates a face of a control and display unit in accordance with an alternate embodiment of this invention.

Operation of the engine management system of this invention will be described in connection with a front panel 134 of the control and display unit 38 illustrated in FIG. 7. While the front panel display and controls as shown in FIG. 7 are designed for use in a four engine airplane, it will be noted that the functions performed thereby are suitable for use on any number of engines on a multiple engine plane.

A plurality of mode switches 136a–d may be selectively depressed to designate an operating mode for the engine management system which corresponds to the flight mode of the aircraft. Mode switch 136a selects the takeoff (TO) mode. Mode switch 136b selects the maximum continuous thrust (MCT) mode. Mode switch 136c selects a turbine gas temperature control (TGT) mode. Mode switch 136d selects a flight idle (IDL) mode. While physically associated with mode switch 136a, indicator light 138, designated GA to identify the go around mode, is not a mode switch but merely indicates when the go around mode has been selected by depression of the go around switch (not shown) which is commonly found on the outside of the throttle levers.

Synchronizing switches 140a–c are used to place the aircraft in a mode wherein the engine management system serves to synchronize the engines. This may be accomplished in addition to or instead of selection of other modes. Synchronizing switch 140a selects the synchronizing mode. Synchronizing switch 140b designates whether synchronization will be with respect to fan speed ($N_1$) or gas generator speed ($N_2$). Synchronizing switch 140c controls the identity of the engine which will be designated as master and with respect to which the other engines will be synchronized.

A power switch (PWR) 142 controls the application of power to the drivers which open and close the variable dimension links 34. Regardless of the condition of power switch 142, power to the control and display unit 38 and the engine management computer 40 is always maintained. Further, should the system be manually shutoff or become inoperative due to power failure or other malfunction, the flight crew will still maintain full control of the fuel metering device through the link 34. Only the automatic trim operation provided by the engine management system will be lost and regardless of system condition, full manual control of the fuel metering device 26 will be maintained. When the power switch is pressed to shut off the system, the link 34 is centered in the manner previously described. Activation of test switch 144 commences internal testing of the system.

Manual numerical inputs can be provided to the system through the thumb wheels on the front panel 134. Thumb wheels 146 permit setting of a desired turbine gas temperature to be utilized when the TGT mode is selected by depression of mode switch 136c. Operation of the reference temperature thumb wheel 148 permits selection of a reference temperature, generally provided by the control tower, for use by the system as a reference during takeoff.

Also provided are a digital display 150 for alternately displaying spool speed or engine temperature level and indicator lights 152a-d for advising the flight crew of trim authority difficulties in connection with the aircraft propulsion engines.

With the power switch 142 in the "on" configuration, mode switch 136a is depressed to place the engine management system in the takeoff mode. In this mode, the reference temperature thumb wheels 148 should be adjusted for selection of the correct value of external ambient air temperature from the tower (onboard sensors generally provide unreliable temperature readings when the aircraft is at rest on a hot runway) to provide a full performance takeoff. This temperature can be adjusted in a known manner if a derated takeoff is desired.

Digital display 150 displays the takeoff $N_1$ target setting at which the engines are desired to run during takeoff, which is preselected in accordance with the reference temperature, pressure altitude and aircraft and engine requirements. When the throttle levers 18 are in the takeoff position, the engine management computer 40 will sense the fan speed of each engine and send appropriate signals to the open driver 90 or close driver 94 (FIG. 6) associated with the variable dimension link 34 for each engine so as to maintain each engine's fan speed at precisely the desired value by direct adjustment of the fuel metering device 26 without any additional input from the flight crew and without motion of the throttle levers 18.

If synchronizing switch 140a has been depressed before the throttle levers are moved to takeoff position, the engine management system will operate while the the throttle levers are being manually moved by the pilot to maintain the engines in synchronization as they are increased in power. At about 95% of the target fan speed displayed on the digital display 150, synchronous operation will be terminated and each engine will be brought independently to the target fan speed.

When the system is in the take off mode, takeoff relay contact 130a (FIG. 6) is open and go around relay contact 102a is closed. Thus, the drivers 90 and 94 for motor 46 are energized to control trimming operation of the engines 12 as soon as the throttle levers have passed flight idle position at which point throttle lever switch 106 is switched from the position illustrated in FIG. 6 to complete the energization circuit and permit the links 34 to depart from the centered position.

As the plane is accelerating on its takeoff run, the engine management system 28 continues to maintain all engines at the desired fan speed. However, at the preset air speed of around 75 kts., the air speed relay 104 receives a signal to open contact 104a. This removes operating power from the drivers 90 and 94 and thus terminates any further trim operation by the system in the takeoff mode. However, no conductive path for energizing the centering switches 124 and 126 is completed and so the links 34 remain at the position to which they were commanded before air speed relay contact 104a opened. This operation is provided to satisfy requirements that no active automatic throttle control be in operation at takeoff. After operation in the takeoff mode has terminated by selection of an alternate mode, a signal is sent by CDU 38 to the takeoff relay 130 to close contact 130a, thus bypassing air speed relay contact 104a to resume trim operation of the engines 12 by the engine management system 28 without regard to aircraft speed.

Depression of mode switch 136b places the system in the maximum continuous thrust mode. Upon selection of this mode, a turbine gas temperature target which is determined by the engine manufacturer and preset into the system microprocessors is displayed on the digital display 150. Trim actuator links 34 are controlled to maintain the engines at this value of turbine gas temperature without surpassing $N_1$ and $N_2$ overspeed limits. Preferably, no engine synchronization is provided in this mode.

Near the end of aircraft climb or upon reaching cruising altitude, the pilot may press mode switch 136c for selection of the turbine gas temperature mode. When this mode is selected, the TGT value entered on the thumb wheels 146 is displayed on the digital display 150. All engines are then controlled through lengthening or shortening of the individual engines' actuator links 34 to maintain this turbine gas temperature. If synchronizing switch 140a has also been depressed, only the master engine selected by synchronizing switch 140c will be controlled at the desired turbine gas temperature and the remaining engines will be synchronized with respect to either $N_1$ or $N_2$ as selected by synchronizing switch 140b in correspondence with that of the selected master engine. It should be noted, however, that if any slave engine should attempt to exceed its TGT limit to remain in speed synch with the master engine, it will be constrained at the selected temperature and will drop out of speed synch with the master engine.

When it is desired to land the airplane, mode switch 136d may be depressed. When the throttle levers are placed in flight idle position, outside air temperature, altitude and bleed configuration of the engines are provided to the engine management computer so that the proper value of $N_2$ may be selected for the engines. The actual value of $N_2$ is compared against the desired value and $N_1$ and TGT limit comparisons are also performed to provide $N_1$ overspeed and TGT control protection. As aircraft altitude decreases, the length of the variable dimension links 34 are constantly adjusted to maintain proper flight idle levels prior to landing.

Should the pilot elect not to land the aircraft and depress the go around button on the throttle levers, indicator light 138 will be lit to show that the system has entered the go around mode. When this occurs, the signal from the control and display unit 38 (FIG. 6) through conductor 114 is terminated, releasing the go around relay 102 to open switch 102a removing power from the drivers 90 and 94 so that no further control of the links 34 will occur. Additionally, centering relay 116 and primary relay 118 are released so that the switches 116a and 118a return to the positions illustrated in FIG. 6. This connects voltage source 120 through conductor 122 to the centering switches 124 and 126. Thus, if the link 34 (FIG. 4) is not in its centered position, such that either actuator 60 (corresponding to centering switch 124) or actuator 62 (corresponding to centering switch 126) is engaged by its corresponding camming surface, winding 86 or 88, respectively, and armature 84 will be energized and motor 46 will operate to return link 34 to its centered position. When each link has been centered, the centering switches will be opened and no further power will be received by the motors 46. Thus, upon entering go around mode, control is removed from the engine management system 28 and all of the variable dimension links 34 are returned to their centered position.

Should the pilot elect instead to complete the landing, he will move the throttle levers to below the flight idle position whereupon the throttle lever switch 106 will return to the position shown in FIG. 6. With go around switch 102a closed, this will connect voltage source 98 to the centering switches 124 and 126. Thus, when the throttles are moved to below flight idle position, power is removed from drivers 90 and 94 and the variable dimension links 34 are brought to their centered position.

It should be noted that in the preferred embodiment the engine management system is given limited trim authority over the fuel metering device 26. Preferably, the full end to end stroke of the variable dimension link 34 will only be about 25% of the full authority fuel control which may be accomplished by the throttle levers 18.

In case of malfunction of one or more engines, it is quite possible that spool speed $N_1$ or $N_2$ or TGT temperature could vary from that of the remaining engines or exceeds its own limits by a sufficiently great amount that it would be beyond the capacity of the engine management system to correct. In this case, or whenever the throttles have exceeded the trim authority limit, indicator lights 152a–d advise the flight crew by lighting either the upwardly or downwardly directed arrow for the affected engine to advise of the direction in which the thrust lever must be moved to bring the engine into an operational range where it can be automatically trimmed in accordance with the requirements of the system.

FIG. 8 illustrates a front panel 156 for an alternate embodiment of a control and display unit 38A which shows one of many possible modifications in the operation of the engine management system of this invention wherein control is based on measurement of engine pressure ratio and aircraft air speed. In this embodiment, which is shown by way of example for use in a three engine aircraft, indicator lights 158 perform, as before, the function of indicating when an engine requires trimming beyond the capacity of the system which must then be performed by manipulation of the corresponding throttle lever. Mode switches 160a–d are used to select the various flight modes while synchronizing switches 162a and b control engine synchronizing operation. Power switch 164, test switch 166 and reference temperature thumb wheels 168 are also provided. Digital display 170 in this embodiment is used to display engine pressure ratio. In addition, speed thumb wheels 172 are used to set a preselected value of mach number or calibrated air speed as selected by a speed selector switch 174.

When the takeoff mode is selected by depression of mode switch 160a and the reference temperature obtained from the control tower has been set in reference temperature thumb wheels 168, the engine management system will control the engines to a computed engine pressure ratio which will be displayed on the digital display 170. Additionally, if synchronizing switch 162a has been depressed, synchronization of the engines will be maintained as they are brought up to speed until they reach about 95 percent of takeoff EPR.

When maximum continuous thrust mode is selected by depressing mode switch 160b, synchronizing is preferably unavailable and the engines are maintained at a preselected EPR value appropriate for climbing operation.

Mode switch 160c selects cruise operation wherein the engines may be maintained at an additional preselected EPR level. Synchronization is also available on $N_1$ or $N_2$ and, as shown in this embodiment by way of example, it is not necessary to permit selection of a master engine. The designated master may be preselected to always be the same or, alternatively, means may be contained in the microprocessor to measure selected engine parameters and perform computations to determine which engine would best function as master for synchronizing purposes.

During cruise operation, it is also possible, by depressing mode switch 160d, to select a constant air speed mode wherein the aircraft will be maintained at the mach number or calibrated air air speed which has been set into the speed thumb wheels 172.

Figure 9:
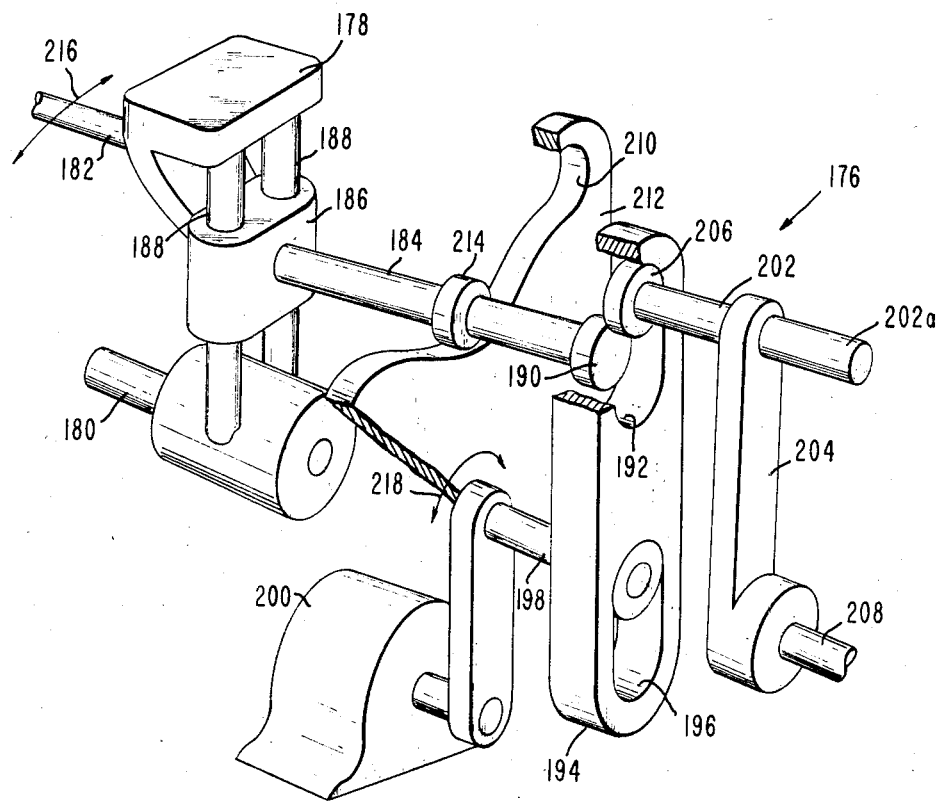
FIG. 9 is an isometric view of a variable authority trim device for use in the energy management system of FIG. 3.

In this embodiment, no provision is made for go around mode or flight idle mode. However, in these flight conditions, it may be desirable to provide for an elimination of trim authority by mechanical means. One such means is illustrated in FIG. 9 as an alternative form of variable dimension link 176.

Figure 4:
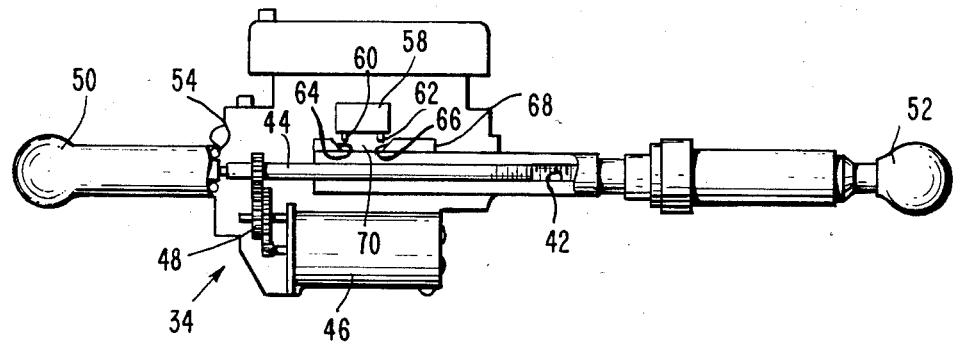
FIG. 4 is a cross-sectional view of an adjustable link for use in the engine management system of FIG. 3.

Unlike link 34 illustrated in FIG. 4, link 176 is a rotary actuator which affects trim operation along a circumferential dimension rather than a linear direction.

An input lever 178 is mounted for rotation on an axis 180 and has a mounting post 182 adapted for connection to cable 22 (FIG. 3) so that action of the throttle levers 18 can cause a resultant rotation of the input lever 178 around the axis 180.

A connecting rod 184 has a first end mount 186 slidably mounted on posts 188 of input lever 178 to permit radial motion of the connecting rod 184. A second end mount 190 of connecting rod 184 rides in a slot 192 of a trim link 194. A slot 196 of trim link 194 holds a trim rod 198, the position of which is fixed as determined by operation of a trim motor 200 which is electrically connected to the engine management computer 40. A mounting post 202 of an output lever 204 has an end mount 206 positioned in slot 192 axially spaced from the second end mount 190 of connecting rod 184. Output lever 204 is mounted for rotation about an axis 208 which is preferably colinear with axis 180. An extended end of mounting post 202a is adapted for securement to the aircraft fuel metering device for controlling operation thereof. Connecting rod 184 extends through a cam slot 210 of a cam 212 and has a cam follower 214 adapted to move through the cam slot 210 engaging the camming surfaces thereof. In operation, action of the throttle levers is transmitted to the input lever 178 which rotates about its axis 180 a shown by an arrow 216. This rotation causes connecting rod 184 to similarly move resulting in rotation of trim link 194 around the fixed axis formed by the trim rod 198. Motion of the trim link 194 causes a corresponding rotational motion of the output lever 204 around its axis 208 such that the fuel metering is adjusted by engagement with the mounting post 202. In this manner, action from the throttle levers is directly passed to the fuel metering device for control of fuel to the aircraft engines.

When the input lever 178 is in the position illustrated in FIG. 9, the axes of the connecting rod 184 and mounting post 202 are laterally spaced from each other within the slot 192. Thus, trimming operation such as previously described to be accomplished by the link 34 of FIG. 4 can occur by energizing the motor 200 to cause motion of the trim rod 198 in either direction designated by the arrow 218. This causes the trim link 194 to rotate about an axis formed by the connecting rod 184 which is more firmly positioned than the mounting post 202. Because of the distance between the axes of the connecting rod 184 and mounting post 202, the mounting 202 is displaced circumferentially with respect to the input lever 178. As a result, fuel metering performance in response to positions of the aircraft throttle levers may be modified in the same manner as was accomplished by the linear motion of link 34.

Link 176 permits a mechanical limitation of trim authority in accordance with a preset schedule which forms the basis of design of the cam 212. As the throttle lever is moved in either direction such that the input lever 178 moves to either end of its stroke, the cam follower 214 is urged radially outwardly by the cam surfaces of the cam 212. This causes the first end mount 186 to move radially outwardly along the input lever 178 while the second end mount 190 moves radially outwardly within the slot 192 of the trim link 194. This motion causes the axes of connecting rod 184 and mounting post 202 to come closer together. It will be readily apparent that as these axes approach each other, motion of the trim rod 198 and resulting rotation of the trim link 194 has a reduced effect on motion of the output lever and, as the thrust levers are moved to their extreme positions, trim authority of the engine management system is accordingly reduced. If desired, the cam can be designed so that, at a desired point in the power lever stroke, the axes of the connecting rod 184 and mounting post 202 coincide. In this position, regardless of the motion of the trim rod 198, no trimming action will result from rotation of the trim link 194.

Thus an engine management system has been disclosed which may be installed in existing aircraft systems for providing limited authority trim operation of aircraft engine fuel metering devices such that fine control of engine thrust may be accomplished with a resultant saving in fuel and in flight crew effort. Multiple mode operation can be provided through this system and, by selecting the engine and external parameters to be sensed, various bases of control can be provided. Additionally, mechanical limitation can be provided for the engine thrust trim operation whereby, regardless of the amount of trimming called for by the engine management system, he configuration of the link prevents any trimming effect on the fuel metering device.

It should be noted that by the use of various algorithms for use by the microprocessor in controlling flight profile, other means of control may be effected. For example, the flight profile may be controlled for maximizing fuel conservation such that the minimum amount of fuel is used during the flight. Alternatively, a flight profile yielding minimum cost, whereby fuel usage is balanced against employee and equipment time utilization in a prescribed manner, may be selected. If desired, a flight profile providing for the least time of flight or for arrival at specified time could be selected. Further, it is possible to connect the engine management system of this invention to a flight navigation management system such that altitude and course may be integrated for consideration in the algorithm to be calculated whereby these factors can be precisely controlled for optimizing flight characteristics.

I claim:

1. An engine management system for an aircraft having at least one engine, said engine management system having a plurality of operating modes corresponding to a plurality of flight modes of said aircraft, said engine management system comprising:

throttle means including throttle lever means movable over a range of positions for commanding corresponding rates of fuel flow to said engine;

fuel metering means operably connected to said throttle lever means and responsive thereto for providing said corresponding rates of fuel flow to said engine;

link means having a variable dimension adjustable over a predetermined range, said link means being operably interposed between said throttle means and said fuel metering means for selectively modifying the rate of fuel flow provided by said fuel metering means in response to a position of said throttle lever means, the rate of fuel flow provided by said fuel metering means corresponding to the rate of fuel flow commanded by said throttle lever means whenever said link means dimension is of a preset value in said predetermined range;

means for receiving parametric inputs representing desired engine performance characteristics, said parametric inputs including at least one of engine speed and engine turbine temperature;

means for selecting an operating mode for said engine management system corresponding to one of said flight modes of said aircraft, one of said operating modes being a go around mode;

link control means drivingly connected to said link means for controllably regulating said link means dimension and thereby selectively modifying said rate of fuel flow;

means for energizing said link control means to modify said rate of fuel flow to the extent necessary to achieve at least one of said desired engine performance characteristics, said energizing means energizing said link control means and thereby modifying said rate of fuel flow in response to said parametric inputs, said actual engine and aircraft performance characteristics, and said selected operating mode, said energizing means causing said link control means to bring said link means to said preset value whenever said engine management system is placed in said go around mode.

2. An engine control system as in claim 1 wherein said link means is mounted proximate to said fuel metering means.

3. An engine management system as in claim 1 wherein said link dimension is linear.

4. An engine management system as in claim 1 wherein said link dimension is nonlinear.

5. An engine management system as in claim 1 wherein the predetermined range of said link means dimension is not greater than about 25% of said throttle lever means range of positions.

6. An engine management system as in claim 1 wherein said preset value is generally at the midpoint of said predetermined range.

7. An engine management system as in claim 1 wherein said link means comprises:
   a first member having an end portion spatially fixed with respect to said throttle lever means;
   a second member having an end portion spatially fixed with respect to said fuel metering means;
   means securing said first and second members for conveying motion from said throttle lever means to said fuel metering means; and
   drive means for selectively modifying the spatial relationship of said first and second member end portions.

8. An engine managment system as in claim 7 wherein said first member and said second member are threaded for securement in jackscrew means for conveying motion of said throttle lever means to said fuel metering means.

9. An engine management system as in claim 7 wherein said first and second members are mounted for rotation about an axis and said drive means is connected for changing the relative circumferential orientation of said first and second members.

10. An engine management system as in claim 7 including:
    a source of motive power;
    first centering switching means operable to connect said drive means to said power source to cause said link means dimension to be generally equal to said preset value;
    second centering switch means operably connected between said first centering switch means and said drive means for permitting application of motive power from said source to said drive means for shortening said link means if said link means dimension is greater than said preset value;
    third centering switch means operably connected between said first centering switch means and said drive means for permitting application of motive power from said source to said drive means for lengthening said link means if said link means dimension is less than said preset value; and
    means for causing both said second centering switch means and said third centering switch means to prevent application of motive power to said drive means when said link means dimension is generally equal to said preset value.

11. An engine management system as in claim 1 wherein said aircraft has a plurality of engines, each engine having a throttle lever means and fuel metering means associated therewith and wherein said system includes a plurality of said link means, each operably interposed between a throttle lever means and its respective fuel metering device, and said link control means is connected to each of said link means for individual control thereof.

12. An engine management system as in claim 1 wherein said input responsive means includes means for controlling engine temperature.

13. An engine management system as in claim 1 wherein said input responsive means includes means for controlling engine speed.

14. An engine management system as in claim 1 wherein said input responsive means includes means for controlling engine pressure ratio.

15. An engine management system as in claim 1 wherein said input responsive means includes means for controlling engine synchronization.

16. An engine management system as in claim 1 wherein said input responsive means includes means for controlling air speed.

17. An engine management system as claim 1 including modes corresponding to takeoff, climb and cruise.

18. An engine management system as in claim 1 wherein the predetermined range of said link means dimension is not greater than about 50% of said throttle lever means range of positions.

19. An engine management system as in claim 1 wherein one of said operating modes is a takeoff mode, said energizing means being inhibited from causing said link control means to modify said link means when said engine management system is in said takeoff mode and air speed is above approximately 75 knots.

20. An engine management system as in claim 1, wherein said energizing means causes said link control means to bring said link means to said preset value whenever said throttle lever means is below flight idle position.

* * * * *